(12) United States Patent
Alcorn

(10) Patent No.: US 7,812,843 B2
(45) Date of Patent: *Oct. 12, 2010

(54) DISTRIBUTED RESOURCE ARCHITECTURE AND SYSTEM

(75) Inventor: Byron A. Alcorn, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 790 days.

This patent is subject to a terminal disclaimer.

(21) Appl. No.: 11/132,827

(22) Filed: May 19, 2005

(65) Prior Publication Data

US 2005/0206646 A1 Sep. 22, 2005

Related U.S. Application Data

(63) Continuation of application No. 10/086,160, filed on Feb. 27, 2002, now Pat. No. 6,933,943.

(51) Int. Cl.
G06F 15/16 (2006.01)
G06F 15/80 (2006.01)

(52) U.S. Cl. .................. 345/505; 345/502; 345/503; 345/504

(58) Field of Classification Search ......... 345/501–506, 345/520, 522, 629
See application file for complete search history.

(56) References Cited

U.S. PATENT DOCUMENTS 5,844,181 A 12/1998 Amo et al.
6,151,621 A 11/2000 Colyer et al.
6,924,807 B2 * 8/2005 Ebihara et al. .............. 345/503

OTHER PUBLICATIONS

"WireGL: A Scalable Graphics System for Clusters", Humphreys et al., ACM SIGGRAPH Aug. 2001.*
Greg Humphreys,et.al, A Distributed Graphics System For Large Tiled Displays, Visualization '99 Proceedings San Francisco, CA.IEEE, copyright 1999, pp. 10.
Steven Molnar, et.al, "PixelFlow: High-Speed Rendering Using Image Composition", Proceedings of Sigraph 92, Computer Graphics, vol. 26, Jul. 2, 1992, XP002988777, pp. 10.
P. F. Fitzgerald,et.al,"Research into Display Sharing Techniques in a Distributed Networking Environment Based on the X Window Graphics System",ACM Conf.1999,XP002261679,pp. 9.

* cited by examiner

Primary Examiner—Hau H Nguyen

(57) ABSTRACT

A distributed resource system comprises a plurality of compute resource units operable to execute graphics applications and generate graphics data, and a plurality of visualization resource units communicatively coupled to the plurality of compute resource units and operable to render pixel data from the graphics data. A first network couples a network compositor to the plurality of visualization resource units. The network compositor is operable to synchronize the received pixel data from the plurality of visualization resource units and receive the pixel data from the visualization resource units and to composite the synchronized pixel data into at least one image. A plurality of display devices, at least one of which is located remotely from the plurality of compute resource units, are coupled to the network compositor and operable to display the at least one image.

34 Claims, 4 Drawing Sheets

DISTRIBUTED RESOURCE ARCHITECTURE AND SYSTEM

RELATED APPLICATIONS

This application is a continuation of U.S. patent application Ser. No. 10/086,160, filed Feb. 27, 2002 now U.S. Pat. No. 6,933,943, entitled "Distributed Resource Architecture and System".

TECHNICAL FIELD OF THE INVENTION

The present invention relates generally to the field of computer systems, and more particularly to a distributed resource architecture and system.

BACKGROUND OF THE INVENTION

In the days when mainframe computers and super computers dominated the digital landscape, users were typically given slices of computing time from a fixed pool so that the computer worked on many jobs in parallel. Users interfaced with the mainframe computers using "dumb terminals" connected to the mainframe computers and simple command line user interface. However, the computing environment gradually shifted to lower-cost personal computers and workstations, which offered users greater control of how their applications executed and a better, more intuitive graphical user interface. More recently however, with the global connectivity provided by the Internet and faster bandwidths, there has been another shift toward simplified or stripped-down computers or appliances connected with the distributed data storage and computing resources provided by "web farms" via the Internet. Web farms are typically clusters of servers, microcomputers and mainframe computers that currently perform mostly web server and hosting function for web applications and web pages.

In the computer graphics domain, current computer graphical visualization systems may employ a cluster of workstations or personal computers executing a graphics application and working simultaneously on a single job to render an image to be displayed on a display device. The image is displayed as a single logical image on a single monitor screen or across multiple monitor screens. Such visualization systems may use a plurality of graphics pipelines to render different portions of an image for display on the display monitor to speed up processing time and improve the quality of the displayed image.

SUMMARY OF THE INVENTION

In accordance with an embodiment of the present invention, a distributed resource system comprises a plurality of compute resource units operable to execute graphics applications and generate graphics data, and a plurality of visualization resource units communicatively coupled to the plurality of compute resource units and operable to render pixel data from the graphics data. A first network couples a network compositor to the plurality of visualization resource units. The network compositor is operable to synchronize the received pixel data from the plurality of visualization resource units and receive the pixel data from the visualization resource units and to composite the synchronized pixel data into at least one image. A plurality of display devices, at least one of which is located remotely from the plurality of compute resource units, are coupled to the network compositor and operable to display the at least one image.

In accordance with another embodiment of the invention, a distributed resource system comprises a plurality of distributed first resource units operable to generate a first set of data, a plurality of second resource units operable to generate a second set of data in response to the first set of data. A traffic controller located remotely from at least one of the plurality of second resource units is communicatively coupled to the plurality of second resource units and operable to collect the second set of data from the plurality of second resource units and synchronize the collected data. A plurality of display devices is coupled to the traffic controller and operable to receive the synchronized data for display to a plurality of users.

In accordance with yet another embodiment of the present invention, a distributed resource system comprises a plurality of first resource means executing at least one computer application and generating a plurality of first data, a plurality of second resource means coupled to the plurality of first resource means for generating a plurality of second data from the plurality of first data received from the plurality of first resource means, and controller means coupled to the plurality of second resource means for receiving the plurality of second data therefrom and operable to synchronize and composite the plurality of second data. Display means are coupled to the controller means for receiving and displaying the synchronized and composited data therefrom.

In accordance with another embodiment of the present invention, a distributed resource graphics processing method comprises generating a plurality of sets of graphics data at geographically disparate locations, rendering the sets of graphics data and generating a plurality of sets rendered pixel data, receiving the plurality of sets of rendered pixel data, synchronizing the plurality of sets of pixel data for an image frame from different sources and compositing pixel data associated with the same image frames into at least one image, and displaying the at least one image.

In accordance with a further embodiment of the present invention, a distributed graphics visualization architecture comprises a plurality of compute resource units, a plurality of graphics pipelines coupled to the plurality of compute resource units, and a plurality of local compositors coupled to the plurality of graphics pipelines. A network compositor is communicatively coupled to the plurality of local compositors via a network and is operable to synchronize and composite graphics data received from the plurality of local compositors into at least one graphical image. A plurality of display devices are coupled to the network compositors and are operable to receive and display the at least one graphical image.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

The preferred embodiment of the present invention and its advantages are best understood by referring to FIGS. 1 through 5 of the drawings, like numerals being used for like and corresponding parts of the various drawings.

Current computer graphical visualization systems such as Hewlett-Packard Company's Visualization Center sv6 (HP sv6) typically employ a cluster of workstations and visualization resources processing and rendering a single graphical image to be displayed as a single image. HP sv6 is described in U.S. patent application Ser. No. 09/715,335, entitled, "SYSTEM AND METHOD FOR EFFICIENTLY RENDERING GRAPHICAL DATA," filed on Nov. 17, 2000.

Figure 1:
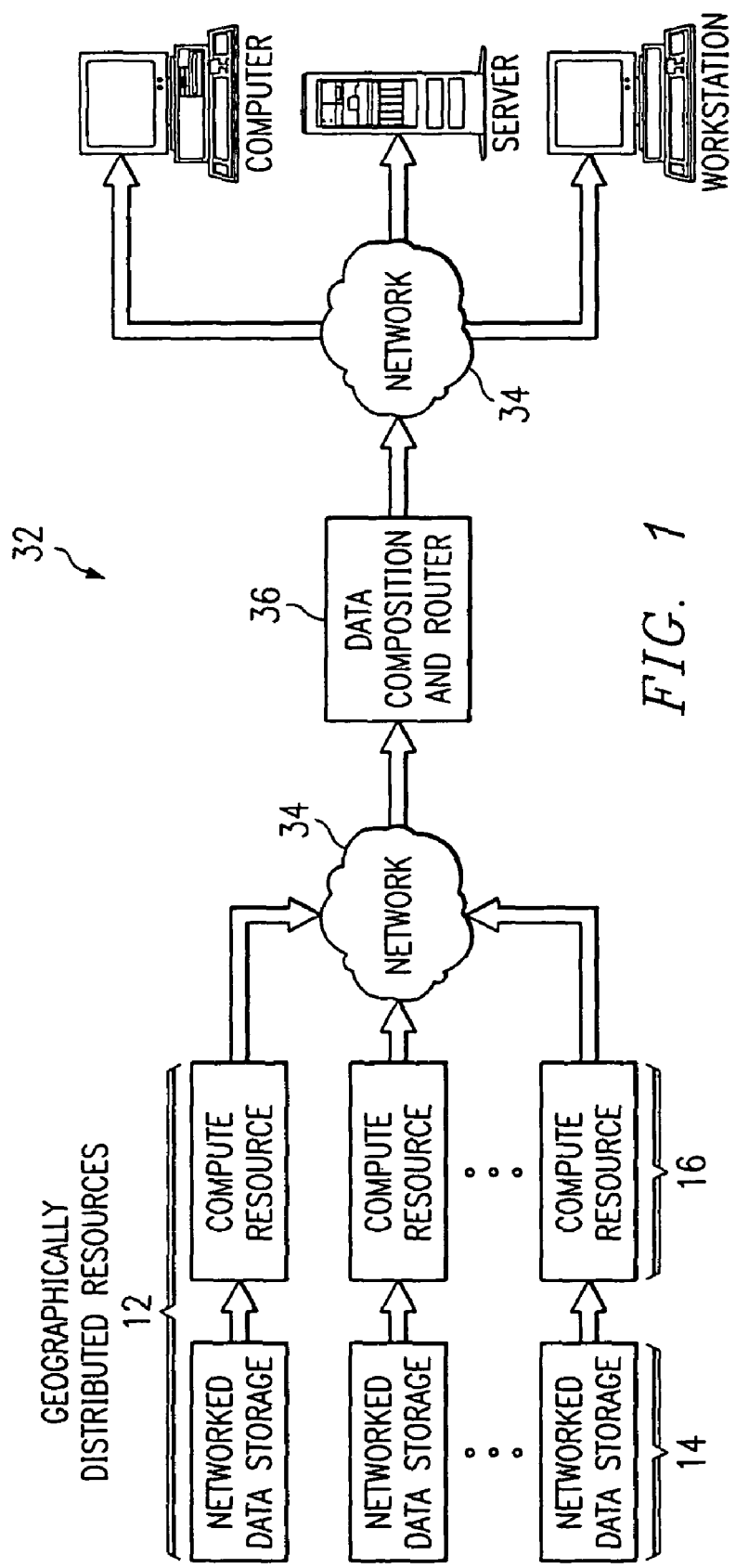
FIG. 1 is a simplified functional block diagram of an embodiment of a distributed resource architecture and system according to the teachings of the present invention.
Figure 2:
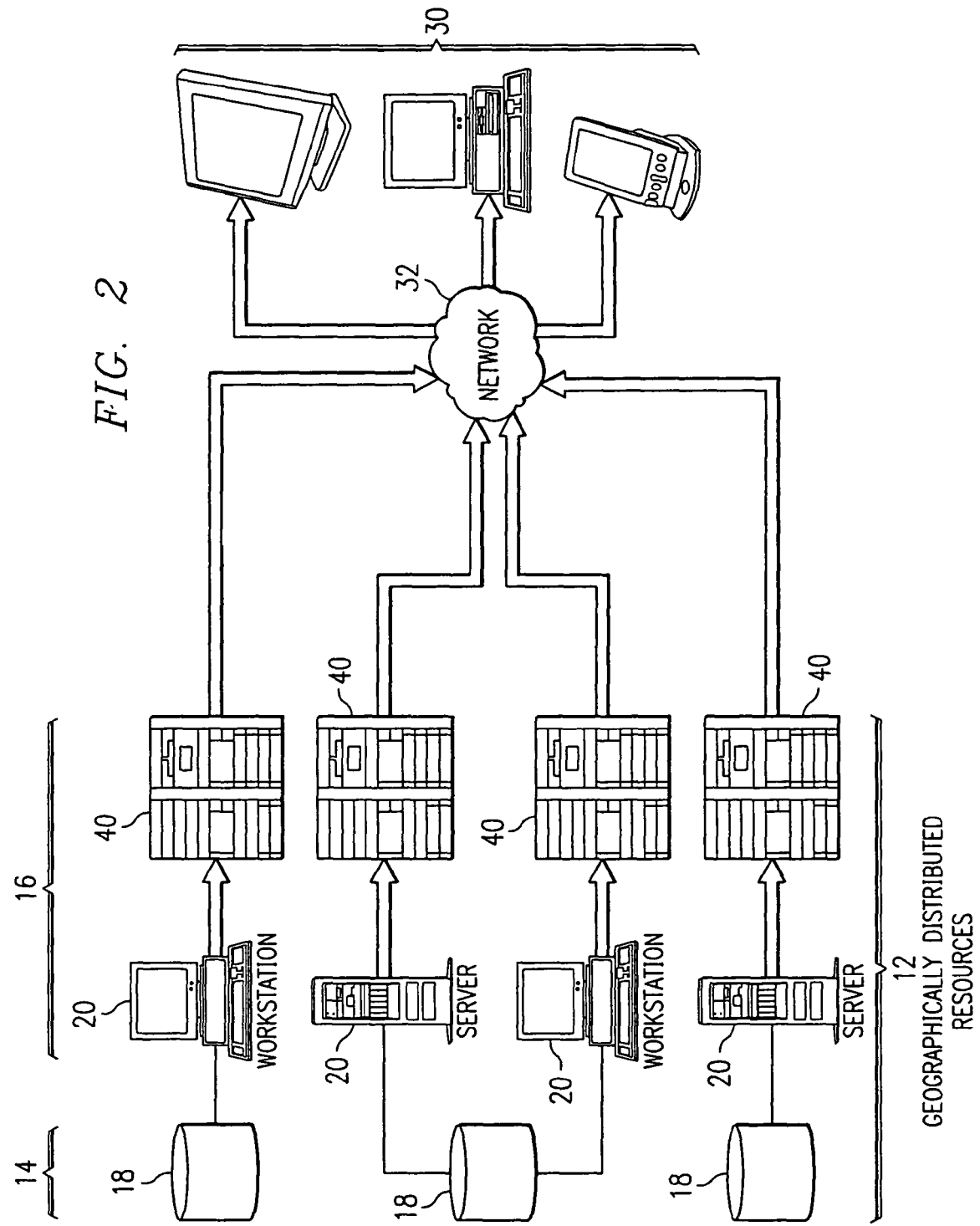
FIG. 2 is a simplified block diagram of an embodiment of a distributed resource architecture and system for graphics visualization according to the teachings of the present invention.
Figure 4:
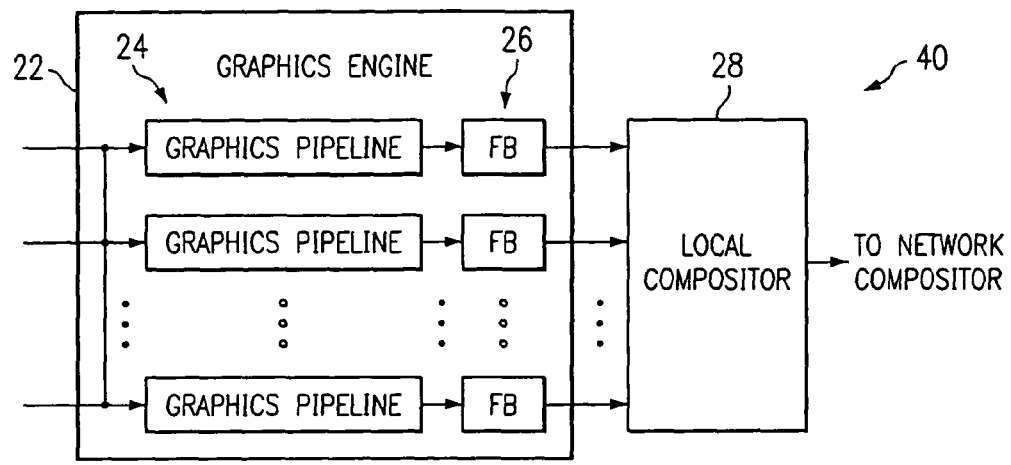
FIG. 4 is a simplified block diagram of an embodiment of a visualization resource.

FIG. 1 is a simplified functional block diagram of an embodiment of a system 10 constructed according to the distributed resource architecture of the present invention. System 10 employs distributed resources 12, which may be geographically distributed across the globe and may comprise data storage building blocks 14, computing resource building blocks 16, and other resources. Each set of co-located building blocks may be implemented in a separate computing and/or storage device or data storage and computing resources may be embodied in a workstation, for example. As shown in FIG. 2, distributed resources 12 comprise networked data storage devices 18, personal computers, workstations, servers and other computers 20, and visualization resources 40 that can be added to the configuration of computing resources or removed there from according to need. There need not be a one-to-one correspondence between the data storage devices, compute resources, and visualization resources, as more than one data storage device may be coupled to a single compute resource, and more than one visualization resource may be coupled to a single compute resource, for example. Software applications such as a graphics application are executed in computers 20 acting as host computers. Visualization resources 40 comprise graphics engines that are typically workstations that have components such as graphics pipelines 24 coupled to respective frame buffers 26, as shown in FIG. 4. The output of frame buffers are coupled to a local compositor 28, that forms images with the pixel data received from the graphics engine. The graphics engine may include specialized hardware and software resources other than those shown in FIG. 4 as known in the art. Graphics engines can range in complexity from a graphics card to an entire workstation. Inputs to graphics pipelines 24 of a graphic engine 22 are coupled to a network such as a local area network (LAN) and are operable to receive graphical data from compute resource 16. Graphics pipelines 24 may be arranged to have a master pipeline and slave pipelines, for example. A frame buffer (FB) 26 is coupled to each graphics pipeline 24 and operable to store one or more frames of image or pixel data rendered by the respective graphics pipeline. The output of frame buffers 26 is rendered pixel data such as DVI (digital video interface) data. DVI data typically comprise the coordinate values of the pixel position to be displayed on the display screen, and the color values of the pixel. For example, DVI data may comprise the (X,Y) coordinate value of the pixel, RGB (red, green, blue), values. DVI data may further comprise a depth value for the pixel (Z), and a transparency value for the pixel (a), and other attributes.

Returning to FIGS. 1 and 2, distributed resources 12 are coupled to user terminals or display devices 30 via networked data compositing resources 32. Networked data compositing resources 32 may comprise networks 34 such as a LAN, wide area network (WAN), intranet, extranet, Internet, or any other suitable network or connectivity, and components 36 for synchronizing, compositing and routing data. User terminals or display devices 30 are devices on which users may view the processed data and the results generated by distributed resources 12. Display devices 30 may employ any display technology now known or later developed. Preferably, user terminals and display devices 30 comprise user input entry devices such as keyboards and pointing devices, however such equipment may not be necessary for certain applications.

According to the teachings of the present invention, all the processing and visualization functions are performed by distributed resources 12 so that distributed data created by geographically disparate users may remain where they are created, and only data associated with the processed result are conveyed to the user(s) who are viewing or using the results. In this manner, large volumes of raw data need not be transmitted over the network, which requires large network bandwidth and high transmission speed. For example in computer graphics applications, raw data generated by geographically distributed engineering design teams, for example vehicle exterior body designs and interior component designs, can remain in place and need not be transmitted to a central location for visualization rendering. Only rendered pixel data are transmitted over network 20 and composited to form the resultant 2D or 3D (two-dimensional or three-dimensional) images. The pixel or image data to be displayed to the user is usually several magnitudes less than the data needed to generate the graphics images, so that the data transmission time is significantly shortened and the data storage requirement at the users' computer terminals is minimal. Furthermore, data storage can remain distributed and co-located with distributed users who created the data and who may continually modify and update the data.

Unlike conventional systems, distributed system 10 is operable to allocate distributed resources 12 to one or more jobs simultaneously to generate one or more results to be displayed on the respective display devices. The allocation unit of the computing resources, for example, may be a CPU (central processing unit) and the allocation unit of the visualization resources, for example, may be a graphics pipeline and its associated hardware/software. A subset of storage, computing and rendering resources is allocated to each job or an execution of an application software for displaying results on a subset of display devices, so that distributed resource system 10 is operable to perform multiple jobs and execute multiple applications distributed over non-co-located resource components.

Figure 3:
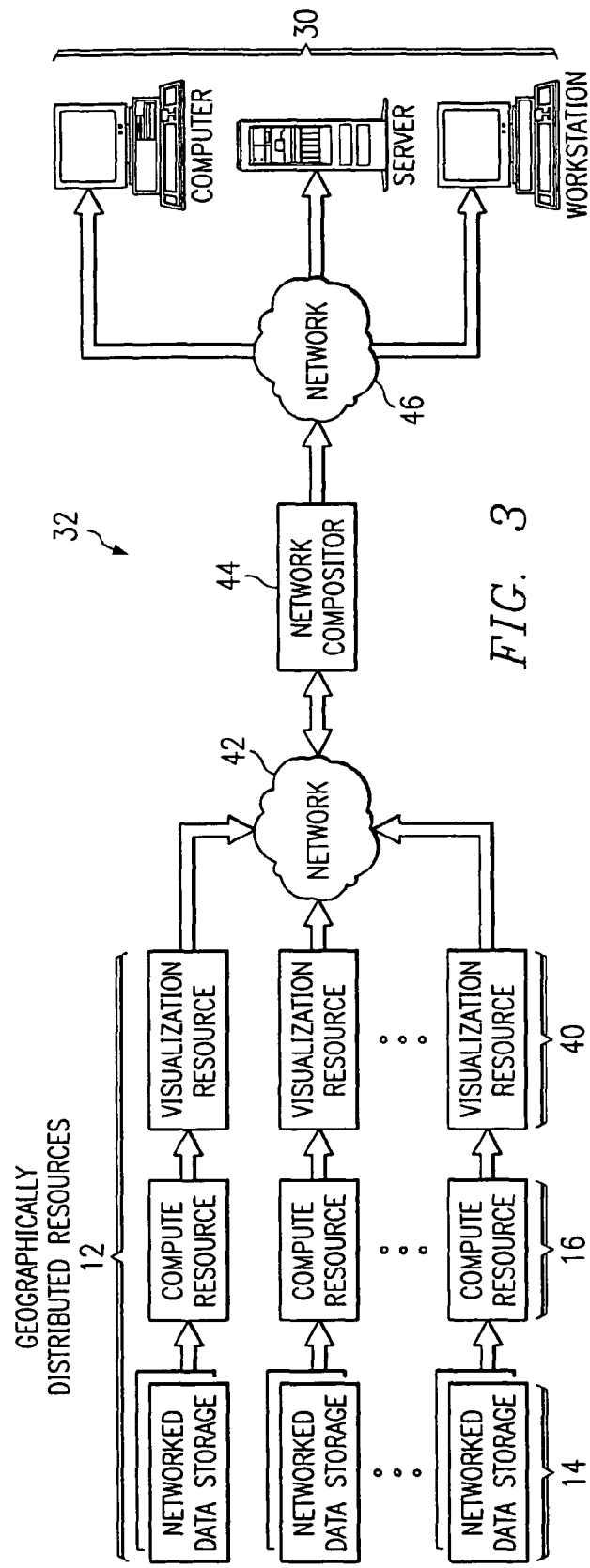
FIG. 3 is a more detailed block diagram of an embodiment of a distributed resource architecture and system for graphics visualization using a network compositor according to the teachings of the present invention.

FIG. 3 is a more detailed functional block diagram of an embodiment of a distributed resource architecture and system 10 for graphics visualization according to the teachings of the present invention. Distributed resource architecture and system 10 comprises data storage devices 14 coupled to compute resources 16. Data storage devices 14 are preferably networked components to facilitate the transfer of data there between and to compute resources 16. Compute resources execute graphics applications for one or more "jobs" and queries and receives the data needed to generate graphics data from networked data storage devices 14. Compute resources 16 are further coupled to a plurality of visualization resources

40. Visualization resource 40 comprises graphics engine, frame buffers, local compositors and other graphics-specific hardware and software.

Visualization resources 40 are coupled to a first network 42, which may be a LAN, WAN, intranet, extranet, Internet, or any other suitable network or connectivity using any number of suitable networking protocols including Ethernet, TCP/IP, and Infiniband now known or later developed. Network 42 may also be a combination of different types of networks. Graphics data are transmitted and routed by first network 42 to a network compositor 44. Network compositor 44 is a graphics compositor that is capable of putting the rendered graphics data together into one or more graphics images. Because of the distributed nature of system 10, network compositor 44 is further capable of handling data latency and synchronization issues that arise due to different distances, transmission speeds and bandwidths in the network. Network compositor is capable of generating and sending feedback control data to the sending resources to slow down or throttle those resources whose transmission rate is significantly faster than that of other resources. Network compositor 44 composites the images from pixel data received from the visualization resources and then sends them to display devices 30 via a second network 46. In most applications, second network 46 is a network for transmission of data over shorter distances, such as a LAN. However, second network 46 is not so limited and may be any one or combination of LAN, WAN, intranet, extranet, Internet, or any other suitable network or connectivity using any number of suitable networking protocols now known or later developed.

In non-graphics specific applications, network compositor 44 may be thought of as a generic traffic controller that is operable to collect data that are more relevant to one another or data which should be displayed or processed together, and that is then operable to send the collected data to the specific display devices. Acting as a traffic controller, network element 44 is operable to synchronize and time the collected data, as described in more detail below.

Figure 5:
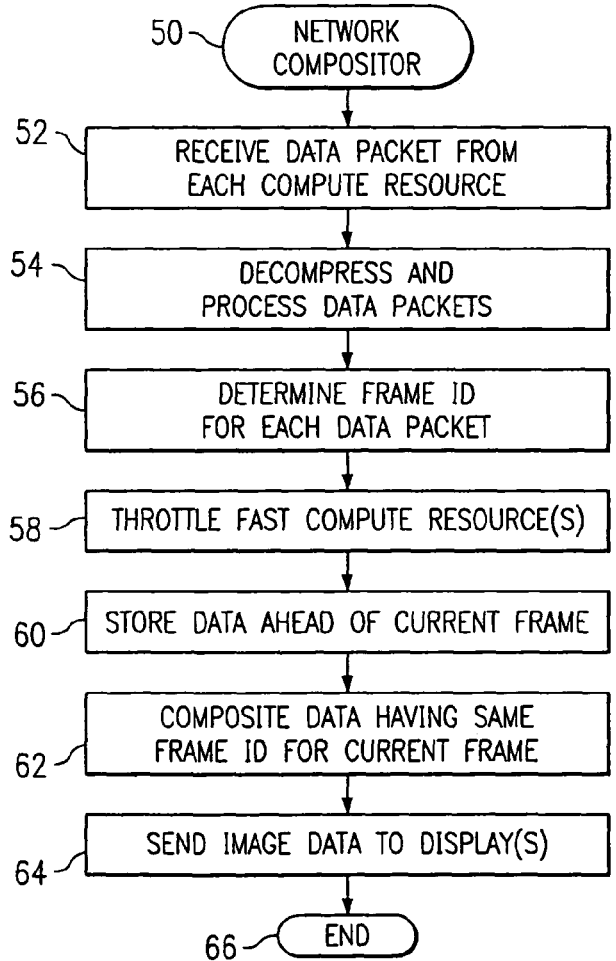
FIG. 5 is a flowchart of a network graphic composite process for processing graphics data according to an embodiment of the present invention.

Referring to FIG. 5, an embodiment for a process 50 for a network compositor dealing with data latency and synchronization is shown. In block 52, network compositor 44 (FIG. 3) receives a data packet from each distributed resource 12. Network compositor 44 then decompresses, extracts and processes data from the data packets, as shown in block 54. This may involve stripping away network protocol headers and other extraneous data. Network compositor 44 may extract a frame identifier (ID) associated with each frame of data and determine a sequence for the frames, as shown in block 56. For example, network compositor 44 may know that frame ID=X is ahead in time of frame ID=X+1. Each packet of data also includes information related to the intended destination of the pixel data, so that network compositor 44 is able to create a composite of data packets from specified one or more subsets of resources. Network compositor 44 then provides a feedback to specific resources to throttle its transmission and processing speeds so that these resources do not significantly outpace other slower resources, as shown in block 58. It may be seen that the feedback may be in the form of control data or messages sent by network compositor 44 to specified visualization resources 40 via network 42. The specified visualization resources may be identified by a destination address in the form of an identifier, for example, in the feedback message. Despite the ability to throttle and control the sending speed of the visualization resources, network compositor 44 may still receive data that have arrived ahead of the current frame being sent for display and stores the data, as shown in block 60. Network compositor 44 may use look-ahead buffers to store the data while waiting for data for the same frame from the remaining resources. Network compositor 44 then composites the pixel data having the same frame ID or some other identifier that are intended for the same image frame, as shown in block 62. Data that have arrived earlier than scheduled may be read from the look-ahead buffers. The composited image is then sent to display devices 30 for display to the users via network 46 (FIG. 3), as shown in block 64. The images may be displayed on several display devices over a geographically distributed region, or displayed over several display devices as one or more logic images. Network compositor thus updates the images displayed on the display devices continually. The network compositor process ends in block 66.

In operation, compute resources 16 execute one or more computer applications or one or more instances of a computer application. The computer applications may be graphical applications used to render one or more graphical images. The graphical images may be displayed as one or more logical screens on one or more display devices. Compute resources 16 are geographically distributed from one another and are preferably respectively co-located with data storage devices storing data related to the images to be rendered. For example, teams of engineers are jointly working on the design of a new concept vehicle. The design team for vehicle engine design is located in City A, the design team for vehicle body exterior design is located in City B, the design team for vehicle interior design is located in City C, and the design team for the vehicle dash design is located in City D. The design review team for the vehicle is located in City E and would like to see the designs of the design teams displayed simultaneously on a number of display devices. The vehicle body exterior design is to be displayed as a single logical image over six physical screens; the vehicle interior design is to be displayed on a single display device; the engine design is to be displayed on two display devices; and the vehicle dash design is to be displayed on a single display device. Though the engine design team is located in City A, the team that performed the simulation of the engine moving components may be located in a different city, City F, and the design review team also requests to view the engine performance simulation images superimposed over the engine design images. In this scenario, network compositor 36 is required to receive pixel data received from geographically disparate resources, composite the images and send the images to the specified display devices. Because some of the images, such as the vehicle exterior body design and the engine design, are not and need not be intimately related in timing, network compositor 36 does not need to control and throttle the sending rate between the respective sending resources. However, network compositor 36 may need to coordinate the engine design images and the engine simulation images and composite the data, thus throttling of the sending resources in this instance may be required. In this scenario the destination display devices are co-located, however this does not need to be the case and the destination display devices may be geographically distributed as well.

Distributed resource system and architecture 10 may be used for generalized computing applications or specialized applications such as graphics and visualization. The resources can be located remotely from the users because only the results of the execution are transmitted over the network to reduce bandwidth requirements and transmit time. Therefore, the bulk of the data needed to generate the results remains where they were generated and are accessed on a more frequent basis. Each resource is operable to access data generally stored co-located therewith, generate the pixel data, and the network compositor is operable to composite the pixel data into one or more graphical images and deliver the images to the dedicated display devices.

What is claimed is:

1. A distributed resource system, comprising:
   a plurality of visualization resource units operable to render pixel data from graphics data received from a plurality of compute resource units; and
   a compositor coupled to the plurality of visualization resource units and operable to receive the pixel data therefrom, the compositor operable to separately throttle the visualization resource units thereby synchronizing the received pixel data from the plurality of visualization resource units and composite the synchronized pixel data into at least one image.

2. The system of claim 1, wherein the plurality of visualization resource units comprise a graphics engine rendering the pixel data.

3. The system of claim 1, wherein at least one of the plurality of visualization resource units comprises a local compositor coupled to a graphics engine operable to composite rendered pixel data into at least one image.

4. The system of claim 1, wherein the compositor is operable to output the at least one image to a display device.

5. The system of claim 1, wherein the compositor is operable to output the at least one image to a display device located remotely from the plurality of compute resource units.

6. The system of claim 1, wherein at least one of the plurality of visualization resource units comprises a plurality of graphics pipelines for receiving the graphics image data from at least one of the plurality of compute resource units.

7. The system of claim 1, wherein the compositor comprises a look-ahead buffer to store pixel data received from at least one of the plurality of visualization resource units.

8. The system of claim 1, wherein the compositor is operable to separately throttle the visualization resource units by transmitting feedback control data via a plurality of messages to the visualization resource units.

9. The system of claim 8, wherein the feedback control data is based on pixel data transmission rates of the visualization resource units.

10. The system of claim 8, wherein each of the messages has an identifier identifying a respective one of the visualization resource units.

11. A distributed resource system, comprising:
    a plurality of visualization resource units operable to render pixel data from graphics data received from a plurality of compute resource units; and
    a compositor coupled to the plurality of visualization resource units and operable to receive the pixel data therefrom, the compositor operable to composite the pixel data into at least one image, the compositor operable to send feedback control data to at least one of the visualization resource units to throttle a pixel data transmission rate of the at least one visualization resource unit.

12. The system of claim 11, wherein the plurality of visualization resource units comprise a graphics engine rendering the pixel data.

13. The system of claim 11, wherein at least one of the plurality of visualization resource units comprises a local compositor coupled to a graphics engine operable to composite rendered pixel data into at least one image.

14. The system of claim 11, wherein the compositor is operable to output the at least one image to a display device.

15. The system of claim 11, wherein the compositor is operable to output the at least one image to a display device located remotely from the plurality of compute resource units.

16. The system of claim 11, wherein at least one of the plurality of visualization resource units comprises a plurality of graphics pipelines for receiving the graphics image data from at least one of the plurality of compute resource units.

17. The system of claim 11, wherein the compositor comprises a look-ahead buffer to store pixel data received from at least one of the plurality of visualization resource units.

18. The system of claim 11, wherein the feedback control data is based on pixel data transmission rates of the plurality of visualization resource units.

19. A distributed resource system, comprising:
    a plurality of visualization resource units operable to render pixel data from graphics data received from a plurality of compute resource units; and
    a compositor coupled to the plurality of visualization resource units and operable to receive the pixel data therefrom, the compositor operable to composite the pixel data into at least one image, the compositor operable to control a pixel data transmission rate of at least one of the visualization resource units.

20. The system of claim 19, wherein the plurality of visualization resource units comprise a graphics engine rendering the pixel data.

21. The system of claim 19, wherein at least one of the plurality of visualization resource units comprises a local compositor coupled to a graphics engine operable to composite rendered pixel data into at least one image.

22. The system of claim 19, wherein the compositor is operable to output the at least one image to a display device.

23. The system of claim 19, wherein the compositor is operable to output the at least one image to a display device located remotely from the plurality of compute resource units.

24. The system of claim 19, wherein at least one of the plurality of visualization resource units comprises a plurality of graphics pipelines for receiving the graphics image data from at least one of the plurality of compute resource units.

25. The system of claim 19, wherein the compositor comprises a look-ahead buffer to store pixel data received from at least one of the plurality of visualization resource units.

26. The system of claim 19, wherein the compositor is operable to separately control pixel data transmission rates of the visualization resource units.

27. A distributed resource graphics processing method, comprising:
    synchronizing a plurality of sets of rendered pixel data received from a plurality of visualization resource units, the plurality of visualization resource units generating the plurality of sets of rendered pixel data from graphics data received from a plurality of compute resource units, the synchronizing comprising sending feedback control data via a plurality of messages from a compositor to the plurality of visualization resource units, each of the messages identifying a respective one of the visualization resource units; and
    compositing, via the compositor, the plurality of sets of rendered pixel data into at least one image.

28. The method of claim 27, further comprising displaying the at least one image.

29. The method of claim 27, further comprising outputting the at least one image to a display device disposed remote from at least one of the compute resource units.

30. The method of claim 27, wherein the sending comprises sending feedback control data from the compositor to at least one of the visualization resource units to throttle a pixel data transmission rate of the at least one visualization resource unit.

31. The method of claim 27, wherein the synchronizing comprises storing pixel data received from at least one of the plurality of visualization resource units in a look-ahead buffer while waiting for pixel data from another visualization resource unit.

32. A distributed resource system, comprising:
 a plurality of visualization resource units operable to render pixel data from graphics data received from a plurality of compute resource units; and
 a compositor coupled to the plurality of visualization resource units and operable to receive the pixel data therefrom, the compositor operable to composite the pixel data into at least one image, the compositor operable to send feedback control data to at least one of the visualization resource units to throttle a processing speed of the at least one visualization resource unit.

33. The system of claim 32, wherein the compositor is configured to slow the processing speed of the at least one visualization resource unit in response to determining that the at least one visualization resource unit is processing faster than another of the plurality of visualization resource units.

34. The system of claim 32, wherein the compositor is operable to send at least a portion of the feedback control data via a message, the message having an identifier that identifiers one of the visualization resource units.

* * * * *